US010298013B2

(12) United States Patent
Yang et al.

(10) Patent No.: US 10,298,013 B2
(45) Date of Patent: May 21, 2019

(54) SYSTEMS AND METHODS FOR INTEGRATING DEMAND RESPONSE WITH SERVICE RESTORATION IN AN ELECTRIC DISTRIBUTION SYSTEM

(75) Inventors: Fang Yang, Raleigh, NC (US); Salman Mohagheghi, Denver, CO (US); Zhao Li, Raleigh, NC (US)

(73) Assignee: ABB Research Ltd., Zurch (CH)

( * ) Notice: Subject to any disclaimer, the term of this patent is extended or adjusted under 35 U.S.C. 154(b) by 672 days.

(21) Appl. No.: 13/595,053

(22) Filed: Aug. 27, 2012

(65) Prior Publication Data

US 2013/0085624 A1  Apr. 4, 2013

Related U.S. Application Data

(60) Provisional application No. 61/542,006, filed on Sep. 30, 2011.

(51) Int. Cl.
*G06F 1/26* (2006.01)
*H02J 3/14* (2006.01)

(52) U.S. Cl.
CPC ............ *H02J 3/14* (2013.01); *Y02B 70/3225* (2013.01); *Y04S 20/222* (2013.01)

(58) Field of Classification Search
USPC ....................................................... 700/297
See application file for complete search history.

(56) References Cited

U.S. PATENT DOCUMENTS 5,642,270 A  6/1997 Green
5,815,824 A  9/1998 Saga
(Continued)

FOREIGN PATENT DOCUMENTS

CN  101689277 A  3/2010
WO  2008118395  10/2008
(Continued)

OTHER PUBLICATIONS

Donde et al., "Short-term Load Forecasting Based Capacity Check for Automated Power Restoration of Electric Distribution Networks" Transmission and Distribution Conference and Exposition, 2010 IEEE PES Apr. 19-22, 2010. pp. 1-8.*

(Continued)

*Primary Examiner* — Emilio J Saavedra
(74) *Attorney, Agent, or Firm* — Taft Stettinius & Hollister LLP; J. Bruce Schelkopf

(57) ABSTRACT

Systems and methods for integrating demand response with service restoration in an electric distribution system. The electric distribution system may include a plurality of regions, zones, and/or areas including at least an outage area that includes a fault and is not receiving electric current from the electric distribution system and a restoration area that is receiving electric current from the electric distribution system and that may be selectively configured to provide electric current to a selected portion of the outage area. The electric distribution system also includes a plurality of demand responsive loads configured to be selectively isolated from the electric distribution system responsive to a load shed signal. The demand responsive loads may be selectively utilized during service restoration, such as to provide additional excess capacity within the restoration area and/or decrease a magnitude of the electric load applied by the selected portion of the outage area.

26 Claims, 6 Drawing Sheets

(56) References Cited

U.S. PATENT DOCUMENTS

| | | | |
|---|---|---|---|
| 6,621,179 | B1 | 9/2003 | Howard |
| 6,697,951 | B1 | 2/2004 | Sinha |
| 7,149,605 | B2 | 12/2006 | Chassin |
| 7,478,070 | B2 | 1/2009 | Fukui |
| 7,747,739 | B2 | 6/2010 | Bridges |
| 7,751,166 | B2 | 7/2010 | Stoupis |
| 7,844,370 | B2 | 11/2010 | Pollack |
| 7,949,435 | B2 | 5/2011 | Pollack |
| 8,335,595 | B2 | 12/2012 | Tolnar |
| 2004/0158360 | A1 | 8/2004 | Garland |
| 2005/0027636 | A1 | 2/2005 | Gilbert |
| 2007/0282495 | A1 | 12/2007 | Kempton |
| 2008/0040479 | A1 | 2/2008 | Bridge |
| 2008/0177678 | A1* | 7/2008 | Di Martini ............ G01D 4/002 705/412 |
| 2008/0225452 | A1 | 9/2008 | Stoupis |
| 2008/0231114 | A1* | 9/2008 | Tolnar .................. H02J 3/14 307/38 |
| 2009/0063680 | A1 | 3/2009 | Bridges |
| 2009/0066287 | A1 | 3/2009 | Pollack |
| 2009/0174365 | A1 | 7/2009 | Lowenthal |
| 2009/0187445 | A1 | 7/2009 | Barclay |
| 2009/0200988 | A1 | 8/2009 | Bridges |
| 2009/0210357 | A1 | 8/2009 | Pudar |
| 2009/0313104 | A1 | 12/2009 | Hafner |
| 2010/0013436 | A1 | 1/2010 | Lowenthal |
| 2010/0017045 | A1 | 1/2010 | Nesler |
| 2010/0079004 | A1 | 4/2010 | Keefe |
| 2010/0088261 | A1 | 4/2010 | Montalvo |
| 2010/0114387 | A1 | 5/2010 | Chassin |
| 2010/0138066 | A1 | 6/2010 | Kong |
| 2010/0179704 | A1 | 7/2010 | Ozog |
| 2010/0211340 | A1 | 8/2010 | Lowenthal |
| 2010/0211643 | A1 | 8/2010 | Lowenthal |
| 2010/0235004 | A1 | 9/2010 | Thind |
| 2010/0277121 | A1 | 11/2010 | Hall |
| 2010/0292857 | A1* | 11/2010 | Bose .................... G05B 15/02 700/292 |
| 2011/0004355 | A1 | 1/2011 | Wang |
| 2011/0025556 | A1 | 2/2011 | Bridges |
| 2011/0029148 | A1 | 2/2011 | Yang |
| 2011/0035073 | A1 | 2/2011 | Ozog |
| 2011/0196546 | A1 | 8/2011 | Muller |
| 2012/0232713 | A1 | 9/2012 | Wang |
| 2012/0239601 | A1 | 9/2012 | Wang |

FOREIGN PATENT DOCUMENTS

| | | |
|---|---|---|
| WO | 2011018703 | 2/2011 |
| WO | 20121057846 | 5/2012 |
| WO | 2012/082173 | 6/2012 |

OTHER PUBLICATIONS

Kleinberg et al., "Service restoration of power distribution systems incorporating load curtailment" IEEE International Symposium on Circuits and Systems, 2009. ISCAS 2009 May 24-27, 2009 pp. 1709-1712.*

Eliasson et al., "A prototype support system for generation of switching instructions" Power System Control and Management, Fourth International Conference on (Conf. Publ. No. 421), Apr. 16-18, 1996, pp. 165-170.*

Axis Ten Products., "Industrial Building Block—General Description—Frequency to Voltage Converter~ATP2/2 FEC Order No. 179932" Axis Ten Products, Aug. 2001, 2 pgs.*

Kirby et al., "Ancillary Services: Technical and Commercial Insights" Jul. 2007, 53 Pages.*

Mekic et al., "Disributed Automation for Back-Feed Network Power Restoration" 20th International Conference on Electricity Distribution, Jun. 8-11, 2009, 5 pgs.*

Tyagi et al., "Emergency Demand Response for Distribution System Contingencies" Transmission and Distribution Conference and Exposition, 2010 IEEE PES Apr. 19-22, 2010, 4 pgs.*

North American Electric Reliability Council, "Electric System Restoration Reference Document" Jul. 2003, 30 Pgs.*

"When Grids Get Smart—ABB's Vision for the Smart Grid," 2008, ABB, USA.

"The Smart Grid: An Introduction," U.S. Department of Energy, USA.

Kleinberg, M. R., Miu, K., and Chiang, H., "Improving Service Restoration of Power Distribution Systems Through Load Curtailment of In-Service Customers," IEEE Transactions on Power Systems, Aug. 2011, pp. 1110-1117, vol. 26, No. 3.

U.S. Appl. No. 13/820,691.
U.S. Appl. No. 13/991,591.
U.S. Appl. No. 14/199,311.
U.S. Appl. No. 14/354,267.

M. Doostizadeh, M. Khanabadi, A. Esmaeilian, M. Mohseninezhad, "Optimal Energy Management of a Retailer with Smart Metering and Plug-in Hybrid Electric Vehicle," 10th International Conference on Environment and Electrical Engineering (EEEIC), May 2011.

C. Pang, P. Dutta, S. Kim, M. Kezunovic, I. Damnjanovic, "PHEVS as Dynamically Configurable Dispersed Energy Storage for V2B Uses in the Smart Grid," 7th Mediterranean Conference and Exhibitiion on Power Generation, Transmission, Distribution and Energy (MedPower 2010), Nov. 7-10, 2010, pp. 1-6.

W. Kempton, J. Tomic, "Vehicle-to-grid power implementation: From stabilizing the grid to supporting large-scale renewable energy," Journal of Power Sources, Dec. 8, 2004.

X. Fang, S. Misra, G. Xue, D Yang, "Smart Grid—The New and Improved Power Grid: A Survey," 2011, from http://www.public.asu.edu/~xfang5/survey_smartgrid_2011.pdf.

IEEE Xplore Abstract for C. Pang, P. Dutta, S. Kim, M. Kezunovic, I. Damnjanovic, "PHEVS as Dynamically Configurable Dispersed Energy Storage for V2B Uses in the Smart Grid," 7th Mediterranean Conference and Exhibitiion on Power Generation, Transmission, Distribution and Energy (MedPower 2010), printed Oct. 22, 2012.

"Demand Response, An Introduction," Rocky Mountain Institute, Boulder, Colorado, Apr. 30, 2006.

S. Grover, I. Ikenze-Bates, "Market Penetration: How to Predict the Future," ACEEE, 1998.

S. Mecum, "A Wish List for Residential Direct Loan Control Customers," ACEEE, 2002.

IEEE Xplore Abstract for X. Fang, S. Misra, G. Xue, D Yang, "Smart Grid—The New and Improved Power Grid: A Survey," printed Apr. 25, 2014.

X. Fang, S. Misra, G. Xue, D Yang, "Smart Grid—The New and Improved Power Grid: A Survey," IEEE Communications Surveys & Tutorials, vol. 14, No. 4, Fourth Quarter 2012, pp. 944-980.

The Patent Office of the People's Republic of China, First Office Action for corresponding Chinese patent application No. 201210385166.0, dated Aug. 6, 2015.

\* cited by examiner

SYSTEMS AND METHODS FOR INTEGRATING DEMAND RESPONSE WITH SERVICE RESTORATION IN AN ELECTRIC DISTRIBUTION SYSTEM

CROSS REFERENCE TO RELATED APPLICATION(S)

This application claims the benefit of and priority to U.S. Provisional Patent Application Ser. No. 61/542,006, which was filed on Sep. 30, 2011 and is entitled "Systems and Methods for Integrating Demand Response with Service Restoration in an Electric Distribution System." The complete disclosure of the above-identified patent application is hereby incorporated by reference for all purposes.

FIELD OF THE DISCLOSURE

The present disclosure is directed generally to systems and methods of restoring electrical service to a selected portion of an electric distribution system, and more particularly to systems and methods that include the use of demand responsive loads as part of an electrical service restoration strategy.

BACKGROUND

Electric distribution systems often include a plurality of power sources and/or power distribution points, such as generating plants and/or electric substations, as well as a plurality of electric loads. Each of these power sources nominally may be configured to provide an electric current to a portion of the plurality of electric loads that are present in a specific region, zone, or other area of the electric distribution system. The electric current may be provided through one or more electric conduits, such as distribution lines or power lines, from the power source to the portion of the plurality of electric loads. Within a given area, power distribution may include a radial topology in which each electric load is supplied by a single power source. Within the radial topology, the electric distribution lines may be configured such that certain electric loads may be upstream, or closer to a power source associated with the given area than other, downstream, loads.

When an electric fault, or fault, occurs within an impacted area of the electric distribution system, one or more isolation devices may be utilized to electrically isolate the fault from the remainder of the impacted area. As used herein, the phrase "impacted area" may refer to any suitable region, zone, and/or area of the electric distribution system that includes one or more faults and which also includes and/or is in electrical communication with one or more electric loads and one or more power sources. A power source that is present within an impacted area also may be referred to herein as an impacted power source.

As used herein, "electrical communication" may include and/or refer to the use and/or presence of any suitable structure to provide an electrical conduit for delivery of electric current between two or more devices. As a non-exclusive illustrative example, placing a first device in electrical communication with a second device may include delivery of electric current, which also may be referred to herein as transfer of electric current, between the first device and the second device if a voltage, or potential, of the first device is different than a voltage, or potential, of the second device. As another non-exclusive illustrative example, placing the first device in electrical communication with the second device may include providing an electrical conduit and electrically connecting or coupling the first device with the second device. However, if no voltage difference, or potential difference, exists between the two devices, no electric current may flow therebetween despite the devices being electrically connected, electrically coupled, or otherwise configured for electrical communication therebetween.

Isolation of a region of the impacted area produces an outage area that may not receive electric current from the impacted power source. This isolation may include utilizing an isolation device that is upstream from the fault to isolate the fault from an upstream portion of the impacted area, which includes the impacted power source, as well as utilizing an isolation device that is downstream from the fault to isolate the fault from the remaining, downstream, portion of the impacted area.

After the fault has been isolated, power may be provided from the impacted power source to the upstream portion of the impacted area while the fault is being repaired. This time to repair the fault may be referred to as the fault reparation time. However, the electric distribution system may not be configured to bypass the fault and also provide electric current from the impacted power source to the downstream portion of the impacted area. Thus, the downstream portion of the impacted area may not receive electric current from the impacted power source during the fault reparation time.

In order to provide electric current to the downstream portion of the impacted area, which may include a sub-portion of the outage area, the electric distribution system may include a network and/or web of areas and/or electric conduits that may be selectively configured to provide electric current to the selected portion during the fault reparation time. This provision of electric current to the selected portion of the impacted area may include providing the electric current to the selected portion from an alternative power source other than the impacted power source. The alternative power source also may be referred to as a restoration power source and nominally may be associated with a different, or restoration, area of the electric distribution system. The sub-portion of the outage area also may be referred to herein as a selected portion of the impacted area, a selected portion of the electric distribution system, a selected portion of the outage area, and/or a selected portion.

The restoration power source may include a maximum, or rated, electric power output. In addition, the electric conduits may provide for the delivery of electric current between the restoration power source and/or the restoration area. Furthermore, the selected portion, or the electrical conduits thereof, may include a maximum, or rated, current carrying capacity. A portion of this rated power output and/or rated current carrying capacity may be utilized by a plurality of electric loads that are associated with, or nominally associated with, the restoration area. Thus, under certain conditions, the restoration area may not include enough excess capacity to provide the electric current to the selected portion without increasing the excess capacity of the restoration area and/or decreasing the electric load that is applied by the selected portion.

SUMMARY

Systems and methods for integrating demand response with service restoration in an electric distribution system. The electric distribution system may include a plurality of regions, zones, and/or areas. When a fault or other outage occurs, the electric distribution system includes at least an outage area, which includes a fault and is not receiving electric current from the electric distribution system, and a restoration area, which is receiving electric current from the electric distribution system and which may be selectively configured to provide electric current to a selected portion of the outage area. The electric distribution system also includes a plurality of demand responsive loads that are selectively configured to be isolated (at least electrically) from the electric distribution system responsive to a load shed signal.

In some examples, the systems and methods may include forecasting an estimated electrical load within the selected portion during an expected fault reparation time, estimating an excess capacity of the restoration area, and/or comparing the excess capacity of the restoration area to the estimated electrical load. The systems and methods also may include evaluating at least a portion of the plurality of demand responsive loads, selecting an isolated portion of the plurality of demand responsive loads to be isolated from the electric distribution system, and/or sending a load shed signal to the isolated portion of the plurality of demand responsive loads. The systems and methods further may include providing electric current from the restoration area to the selected portion.

DETAILED DESCRIPTION

Figure 1:
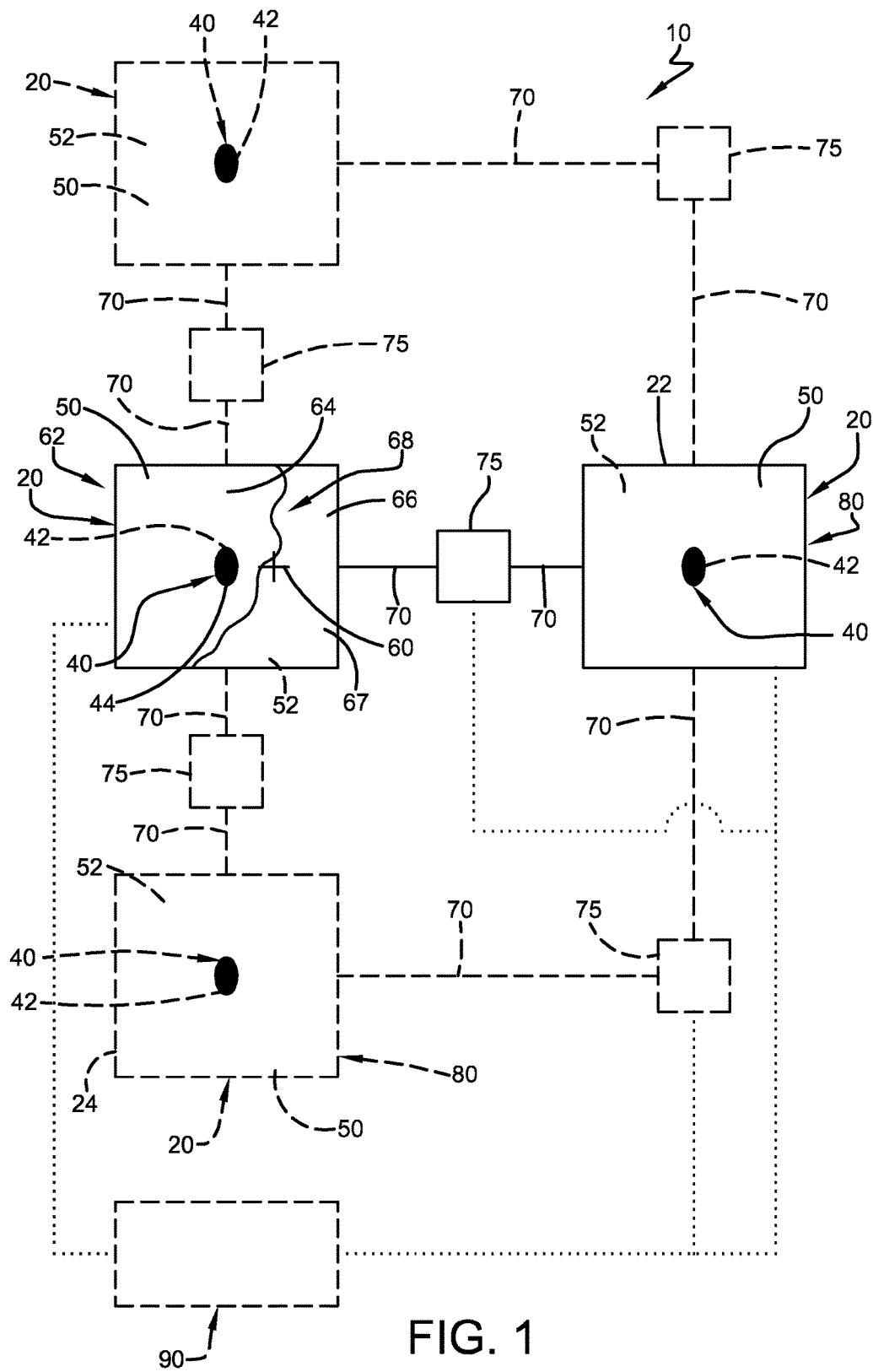
FIG. 1 is a schematic representation of non-exclusive illustrative examples of an electric distribution system that includes a plurality of zones.

FIG. 1 is a schematic representation of non-exclusive illustrative examples of an electric distribution system 10. As may be understood, electric distribution system 10 also may be and/or include a power distribution system, an electric power distribution system, a power grid, an electric grid and/or an electrical grid. Electric distribution system 10 includes a plurality of regions, areas or zones 20. Each zone 20 includes at least one power source, or power distribution point, 40, such as an electric substation, or substation, 42. The substation 42 or other power distribution point 40 may provide electric current to one or more electric loads, or loads, 50 that may be present within respective zone(s) 20.

Electric distribution system 10 may, additionally or alternatively, include one or more demand responsive (DR) loads 52, which are configured to be selectively isolated from electric distribution system 10 responsive to receipt of a load shed signal by one or more of the DR loads. As used herein, the term "isolated" may include at least electrical isolation or disconnection of the DR load from at least a portion of the electric distribution system, or even electrical isolation or disconnection of the DR load from the electric distribution system. As a non-exclusive illustrative example, a selectively isolated DR load may be electrically isolated from the portion of the electric distribution system such that an electric current that may be supplied to that portion of the electric distribution system is not provided to the isolated DR load. As discussed in more detail herein, this isolation may include the use of any suitable isolation device to electrically isolate the DR load from the portion of the electric distribution system.

As used herein, the term "demand responsive load" or "DR load" includes electric loads that form a part of and/or participate in a demand response program. A demand response program is distinctly different from brownouts and/or blackouts, in which the electric utility is unable to provide electric current to at least a portion of the electric loads applied to the electric distribution system due to the occurrence of a fault within the electric distribution system and/or a limitation in the electric current and/or a limitation in the power that is available to supply the electric loads that are applied to the electric distribution system.

Brownouts and/or blackouts may result in the loss of electric current supply to customers without the customers' prior consent. In fact, due to their very nature, blackouts and brownouts almost exclusively occur regardless of whether or not a customer has given prior consent or agreement to have all, or a portion of, the customer's electric current supply interrupted responsive to receipt of the load shed signal. In contrast, and in a demand response program, an electric utility may provide incentives, such as financial incentives, to customers who contractually agree to decrease, otherwise reduce, or shed, the electric load that they apply to the electric distribution system during certain timeframes, which may be determined by the electric utility. The electric load applied to the electric distribution system by the customer may be referred to herein as the customer load or, when the customer is participating in a demand response program, as the DR load.

The load reduction, or demand reduction, may be voluntary, such as when the customer may elect to decrease the electric load that is applied to the electric distribution system in response to changes in electricity prices. Additionally or alternatively, the load reduction may be involuntary, such as when the customer load is decreased responsive to receipt of the load shed signal, which may be generated by the electric utility.

Involuntary load reductions may include a manual load reduction, in which the customer receives the load shed signal and manually determines which loads will be isolated from the electric distribution system and/or to what extent the loads will be decreased. Demand response programs that utilize manual load reduction additionally or alternatively may be referred to as interruptible DR. Involuntary load reductions additionally or alternatively may include automatic load reduction, in which the load at the customer site may be remotely controlled, or reduced, by the electric utility. This form of demand response and/or involuntary load reduction may be described as including and/or being direct load control.

The contractual or other agreement between the electric utility and the customer that is participating in the DR program may include a variety of parameters, or constraints, under which the customer load may be reduced, or requested to be reduced, by the electric utility. As a non-exclusive illustrative example, these parameters may include a notification time interval for the DR load. The notification time interval may include a time, a minimum amount of elapsed time, and/or a maximum amount of elapsed time from the receipt of the load shed signal by the customer to the actual decrease in the load applied to the electric distribution system by the customer. As another non-exclusive illustrative example, these parameters may include a maximum load shed time, which may include a maximum amount of time that a customer's load may be reduced and/or be isolated from the electric distribution system. It should be recognized that the agreement between the electric utility and the customers may vary from customer to customer and/or from utility to utility and that the corresponding terms, incentives, parameters, constraints, etc., may vary without departing from the scope of the present disclosure.

In general, power sources 40 may be associated with and/or nominally in electrical communication with a single, or specific, zone 20 and may be configured to provide electric current to loads 50 present within the zone. While a single power source 40 is shown in each zone 20 of FIG. 1, it is within the scope of the present disclosure that zones 20 may include and/or be in electrical communication with any suitable number of power sources 40. Thus, while the discussion herein will, in general, refer to a power source 40 for each zone 20, a zone 20 may include a plurality of power sources 40, and a power source 40 may refer to more than a single source of power, such as with the sources collectively representing, or forming, a power source 40.

A maximum, rated, and/or designed capacity of a specific power source associated with a specific zone may be selected based upon a magnitude of the load(s) present within the zone, for example, such that the rated capacity of the specific power source is at least as large as the magnitude of the load(s) present within the specific zone. When the rated capacity of the specific power source is greater than the magnitude of the load(s) present within the zone, the difference between the rated capacity of the specific power source and the magnitude of the load(s) present within the zone may be referred to as an excess capacity of the specific power source, or simply as an excess capacity.

As shown in FIG. 1, electric distribution system 10 may be selectively configured to provide delivery of electric current between and/or among at least a portion of the plurality of zones 20 present therein. This may include the use of electric conduits 70, such as distribution lines or power lines, as well as isolation devices 75, to provide and/or control the delivery of electric current between and/or among the portion of the plurality of zones. Such a configuration may provide for the use of the excess capacity that is associated with and/or present within a first zone to provide electric current to one or more loads associated with a second zone.

As a non-exclusive illustrative example, and as shown in FIG. 1, a fault 60 may occur within an impacted area 62 of electric distribution system 10. When this occurs, an outage area 68 may be produced. As discussed in more detail herein, the electric distribution system may be configured to respond to detection and/or occurrence of fault 60 by isolating the fault from the remainder of impacted area 62. Before, during, and/or after isolation of the fault, the impacted area may include an upstream area 64 that is still receiving electric current from an impacted power source 44 associated with the impacted area, as well as a downstream area 66, which forms a portion of outage area 68 and is not receiving electric current from the impacted power source.

After isolation of fault 60 from the remainder of impacted region 62, electric distribution system 10 may be configured to provide electric current to at least a portion of downstream area 66, which also may be referred to herein as a selected portion 67 of electric distribution system 10, by supplying electric current to selected portion 67 from a power source other than impacted power source 44. This may include supplying electric current from another zone 20 of electric distribution system 10, a non-exclusive illustrative example of which includes restoration area 80.

Restoration area 80 may include sufficient excess capacity to provide electric current to all loads 50 associated with selected portion 67. In such a situation, the restoration area may provide this current to satisfy the loads without requiring utilization of DR loads. However, in many situations, restoration area 80 may not include sufficient excess capacity to provide electric current to all of the loads associated with selected portion 67.

When the restoration area does not include sufficient excess capacity, the electric distribution system may utilize at least a portion of DR loads 52 that are present within electric distribution system 10 as virtual capacity sources to increase the excess capacity of restoration area 80 and/or to decrease the load applied by selected portion 67. This may include isolating one or more DR loads 52 associated with restoration area 80 from the restoration area to increase the excess capacity of the restoration area. Additionally or alternatively, this also may include isolating one or more DR loads 52 associated with impacted area 62, downstream area 66, outage area 68, and/or selected portion 67 to decrease the electric load of selected portion 67.

As an illustrative, nonexclusive example, this increase in the excess capacity of restoration area 80 and/or decrease in the electric load of selected portion 67 may be utilized to at least equal or match the excess capacity of restoration area 80 to the electric load of selected portion 67. As another non-exclusive illustrative example, this increase in the excess capacity of restoration area 80 and/or decrease in the electric load of selected portion 67 may be utilized to ensure that the excess capacity is greater than the electric load of selected portion 67 and/or greater than the electric load of selected portion 67 by at least a threshold amount.

As shown in FIG. 1, electric distribution system 10 may include and/or be in communication with a controller 90 that is configured to control the operation of at least a portion of the electric distribution system. As a non-exclusive illustrative example, controller 90 may control the operation of one or more zones 20 of the electric distribution system, including impacted area 62, upstream area 64, downstream area 66, selected portion 67, outage area 68, and/or restoration area 80. As another non-exclusive illustrative example, controller 90 may, additionally or alternatively, control the operation of one or more isolation devices 75. As yet another non-exclusive illustrative example, controller 90 may, additionally or alternatively, be configured to send the load shed signal to one or more of the plurality of DR loads 52 present within electric distribution system 10. As yet another non-exclusive illustrative example, controller 90 may, additionally or alternatively, control the operation of the electric distribution system by performing any of the methods disclosed herein.

While controller 90 of FIG. 1 is shown as being connected to only a portion of the plurality of components of electric distribution system 10, it is within the scope of the present disclosure that controller 90 may be connected with and/or control any suitable component and/or portion of electric distribution system 10.

In addition to the non-exclusive illustrative examples of structures and/or components disclosed herein, electric distribution system 10 may, additionally or alternatively, include and/or be in electrical communication with any suitable additional structure(s) that are configured to generate, distribute, and/or transmit electric energy from any suitable power source to any suitable load. Non-exclusive illustrative examples of these additional structures include any suitable electricity generation plant, power plant, transmission line, distribution line, distribution network, and/or transformer.

Loads 50 may include any suitable load that is configured to receive and/or consume electric energy, electric current, and/or electric power that may be supplied by the electric distribution system. Non-exclusive illustrative examples of loads include industrial loads, residential loads, commercial loads, motors, fans, blowers, compressors, heaters, refrigeration equipment, computing and/or electronics equipment, heating and/or air conditioning equipment, telecommunication equipment, and/or manufacturing equipment.

Isolation devices 75 may include any suitable structure that is configured to selectively provide electrical communication, or delivery of electric current, therethrough. Non-exclusive illustrative examples of isolation devices 75 include any suitable switch, breaker, contactor, and/or tie switch. These may include normally open isolation devices that are nominally configured in an open state, in which electric current may not flow therethrough, but which may be transitioned to a closed state, in which electric current may flow therethrough, as well as normally closed isolation devices that are nominally configured in the closed state but may be transitioned to the open state.

Transitioning between the open and closed state may be accomplished in any suitable manner. As a non-exclusive illustrative example, isolation devices 75 may be configured to be manually transitioned between the open and the closed states. As another non-exclusive illustrative example, isolation devices 75 may be configured to be automatically transitioned between the open and the closed states responsive to any suitable criteria and/or responsive to receipt of any suitable signal.

As shown in FIG. 1, isolation devices 75 may be configured to selectively enable, restrict or interrupt the delivery of electric current (i.e., enable, restrict and/or interrupt electrical communication) between and/or among the various zones 20 of electric distribution system 10. Additionally or alternatively, at least a portion of the DR loads 52 associated with electric distribution system 10 may include and/or be in electrical communication with one or more isolation devices that are configured to isolate the DR load from the electric distribution system responsive to and/or responsive to receipt of the load shed signal.

Restoration area 80 may include any suitable one and/or number of the zone(s) 20 that may be selectively configured to provide electric current to impacted area 62 and/or selected portion 67. As a non-exclusive illustrative example, FIG. 1 depicts a restoration area 80 that includes zone 22 and that also may, additionally or alternatively, include zone 24.

Figure 2:
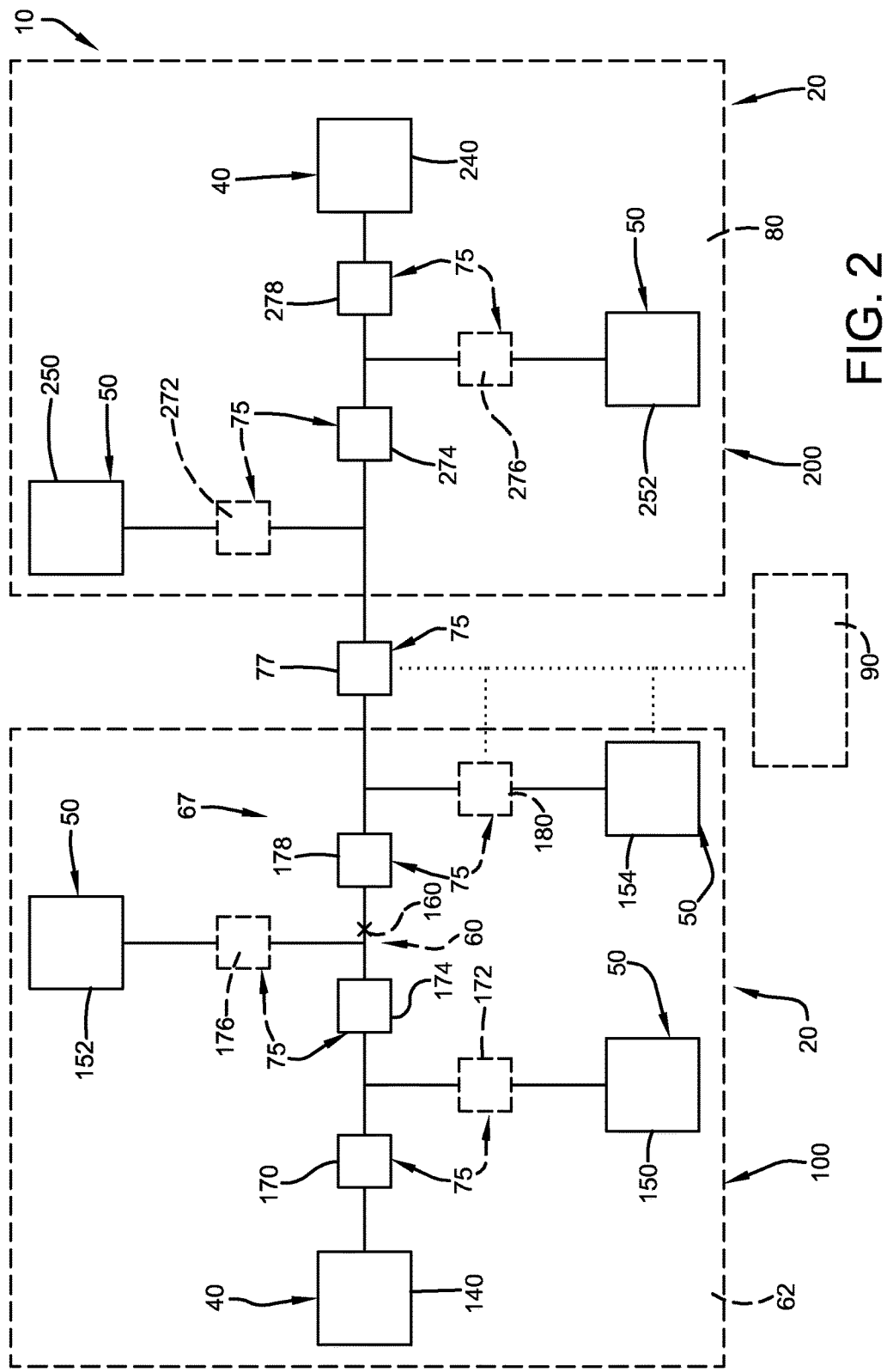
FIG. 2 is a less schematic representation of non-exclusive illustrative examples of an electric distribution system that includes a plurality of zones.

FIG. 2 is a less schematic representation of additional non-exclusive illustrative examples of an electric distribution system 10. The electric distribution system of FIG. 2 includes two zones 20, namely, first zone 100 and second zone 200.

First zone 100 includes a power source 40, namely, first power source 140, and a plurality of loads 50, which may be referred to individually as loads 150, 152, and 154. First zone 100 also may include a plurality of isolation devices 75, which may be referred to individually as isolation devices 170, 172, 174, 176, 178, and 180 and may be and/or include normally closed isolation devices.

Second zone 200 includes a power source 40, namely, second power source 240, and a plurality of loads 50, which may be referred to individually as loads 250 and 252. Second zone 200 also may include a plurality of isolation devices 75, which may be referred to individually as isolation devices 272, 274, 276, and 278 and may be and/or include normally closed isolation devices.

Electric distribution system 10 also includes an additional isolation device 75, which may be referred to individually as isolation device 77, between first zone 100 and second zone 200. Isolation device 77 may be selectively configured to selectively enable, restrict or interrupt the delivery of electric current between at least a portion of first zone 100 and at least a portion of second zone 200 and may be and/or include a normally open isolation device.

As discussed in more detail herein, isolation devices 75 may be selectively configured to isolate at least a first portion of electric distribution system 10 from at least a second portion of electric distribution system 10 responsive to a fault within the electric distribution system and/or responsive to receipt of a load shed signal from electric distribution system 10. As a non-exclusive illustrative example, responsive to a fault in load 152, isolation device 176, when present, may transition from a closed state, in which electric current may flow therethrough, to an open state, in which electric current may not flow therethrough, thereby electrically isolating faulted load 152 from the remainder of first zone 100. Under these conditions, first power source 140 may continue to provide electric current to the remainder of first zone 100. Additional non-exclusive illustrative examples of the response of electric distribution system 10 of FIG. 2 to various fault, load, and/or power source conditions are discussed in more detail herein with reference to FIGS. 3-5.

Figure 3:
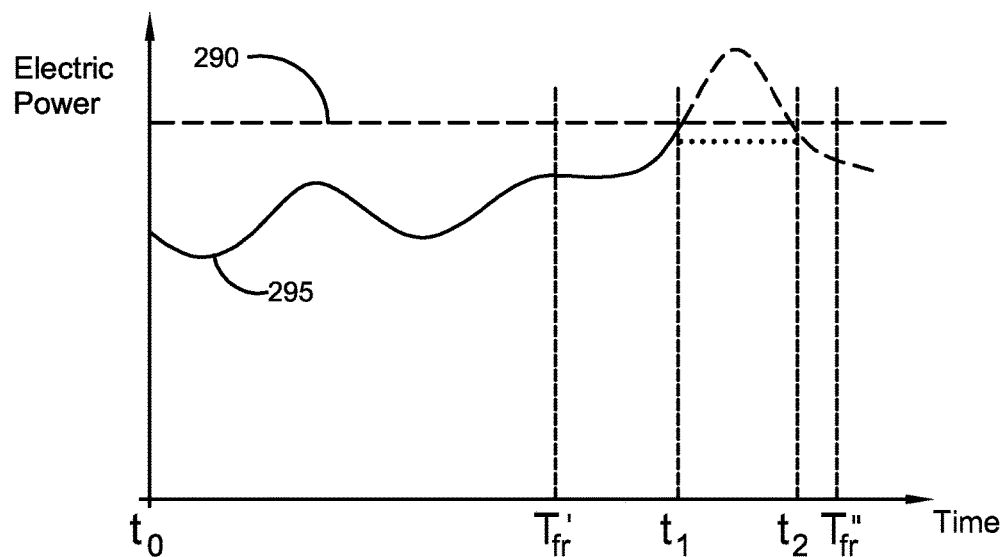
FIG. 3 is a schematic graph providing a non-exclusive illustrative example of an electric power vs. time plot.

FIG. 3 provides a non-exclusive illustrative example of an electric power vs. time plot, which also may be referred to as an electric power vs. time trend, an electric power vs. time graph, a capacity vs. time plot, and/or a load vs. time plot, for the electric distribution system of FIG. 2. As discussed in more detail herein, once a fault has occurred, the electric distribution system may isolate the fault from the remainder of the impacted area. This isolation may provide for the supply of electric current from the impacted power source to the portion of the impacted region that is upstream from the fault; however, the portion of the impacted region that is downstream from the fault may not receive electric current from the impacted power source. Under these conditions, and as discussed in more detail herein, a restoration area may be utilized to provide electric current to the downstream portion of the impacted area.

As a non-exclusive illustrative example, and with reference to FIG. 2, an impacted area 62 may include first zone 100 due to the occurrence of a fault 60, such as indicated as fault 160 within the impacted area. Responsive to occurrence of fault 160, electric distribution system 10 may isolate the fault from the remainder of impacted area 62. This may include transitioning isolation devices 174 and 178 from a closed state to an open state. Under these conditions, load 150 may be upstream from fault 160 and may receive electric current from first source 140. However, load 154 may be downstream from fault 160 and may not receive electric current from first source 140. Unless load 154 is supplied with electric current from another source, load 154 may be without electric current for the entire fault reparation time. Thus, electric distribution system 10 may, under certain circumstances, be selectively configured to provide electric current to selected portion 67 of first zone 100 from another, or alternative, source of electric current, such as second zone 200, which also may be referred to as a restoration area 80.

As discussed in more detail herein, restoration area 80 may provide electric current to selected portion 67 if the excess capacity of the restoration area is sufficient to satisfy the electric load that would be applied to the restoration area by the selected portion during the fault reparation time and/or if a capacity of restoration area 80 is greater than a total load that may be applied to the restoration area by the loads present within the restoration area and the loads present within selected portion 67. This is shown schematically in FIG. 3, which depicts a total load 295 that may be applied to the restoration area and a capacity 290 of the restoration area as a function of time. Between $t_0$ and $T_{fr}'$, capacity 290 of restoration area 80 is greater than total load 295 that may be applied to second power source 240 by second zone 200 and selected portion 67. Thus, between $t_0$ and $T_{fr}'$, second power source 240 may include sufficient excess capacity to supply electric current to selected portion 67, and electric distribution system 10 may transition isolation device 77 from the open state to the closed state to provide electric current from restoration area 80 to selected portion 67 without the use of DR loads 52 to increase the excess capacity of restoration area 80 and/or decrease the magnitude of the load applied to the restoration area by selected portion 67.

In contrast, and as also discussed in more detail herein, restoration area 80 may not provide electric current to selected portion 67 if the excess capacity of the restoration area 80 is insufficient to satisfy the electric load that would be applied to the restoration area 80 by the selected portion 67 (i.e., if the total load applied to the restoration area would be greater than and/or within a threshold magnitude of the capacity of the power source(s) associated with the restoration area). Under these conditions, one or more DR loads 52 may be utilized to change the excess capacity of restoration area 80 and/or total load 295 such that the magnitude of capacity 290 is greater than or equal to the magnitude of total load 295.

This is shown in dashed lines in FIG. 3 where, between $t_1$ and $t_2$, total load 295 would be greater than capacity 290 if the total load were to include all loads in restoration area 80 and all loads in selected portion 67. However, and as shown in dotted lines in FIG. 3, and in the context of the previously discussed selected portion 67 of restoration area 80 of electric distribution system 10, by isolating, or shedding, one or more DR loads 52 associated with selected portion 67 and/or restoration area 80 from electrical communication with electric distribution system 10, total load 295 may be decreased to a value that is less than capacity 290.

This DR load shedding may be accomplished in any suitable manner. As a non-exclusive illustrative example, and with continued reference to FIGS. 2 and 3, load 250 may include a DR load 250, and electric distribution system 10 may isolate DR load 250 from electric communication with the electric distribution system, such as through the use of isolation device 272, thereby increasing a magnitude of the excess capacity of second power source 240. As another non-exclusive illustrative example, load 250 may include DR load 250 and electric distribution system 10 may decrease a magnitude of the load that is applied to the electric distribution system by DR load 250, thereby increasing a magnitude of the excess capacity of second power source 240. As another non-exclusive illustrative example, load 154 may include a DR load 154, and electric distribution system 10 may decrease a magnitude of DR load 154, thereby decreasing a magnitude of the load that is applied to restoration area 80 by selected portion 67. As yet another non-exclusive illustrative example, at least two of load 154, load 250, and load 252 may include DR loads, and electric distribution system 10 may decrease a magnitude of at least two of load 154, load 250, and load 252 such that total load 295 is less than capacity 290.

In the non-exclusive illustrative example of FIG. 3, electric distribution system 10 of FIG. 2 may respond to fault 160 of duration $T_{fr}'$ by closing isolation device 77 and supplying electric current to selected portion 67 without first adjusting either the magnitude of the load that is applied to restoration area 80 by selected portion 67 or the excess capacity of restoration area 80. In contrast, electric distribution system 10 may respond to fault 160 of duration $T_{fr}''$ by decreasing the magnitude of the load that is applied by selected portion 67 and/or increasing the magnitude of the excess capacity of restoration area 80 during at least a portion of fault reparation time $T_{fr}''$, such as between $t_1$ and $t_2$, such that total load 295 is less than capacity 290 prior to closing isolation device 77 and supplying electric current from restoration area 80 to selected portion 67.

It is within the scope of the present disclosure that $T_{fr}'$ and $T_{fr}''$ may represent two different fault reparation times that may correspond to the fault reparation time for two different faults. Additionally or alternatively, it is also within the scope of the present disclosure that $T_{fr}''$ may represent an updated fault reparation time, such as when an initial fault reparation time ($T_{fr}'$) was estimated for repair of the fault but the fault reparation time is updated to a longer fault reparation time ($T_{fr}''$).

Figure 4:
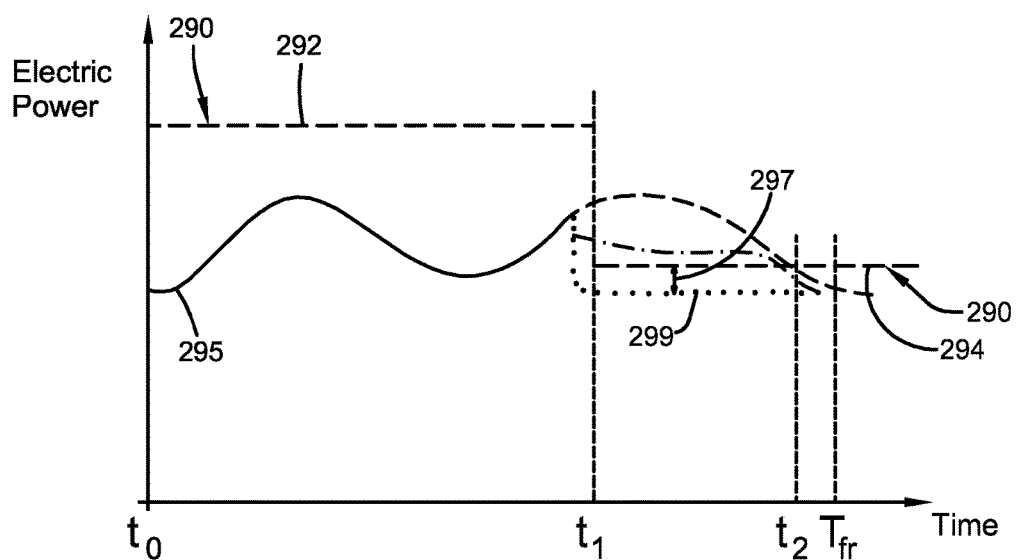
FIG. 4 is another schematic graph providing a non-exclusive illustrative example of an electric power vs. time plot.

FIG. 4 provides another non-exclusive illustrative example of an electric power vs. time plot for the electric distribution system of FIG. 2 that includes fault 160, as discussed in more detail herein with reference to FIG. 3. Specifically, fault 160 has been isolated from the remainder of first zone 100 by opening normally closed isolation devices 174 and 178. Restoration area 80, which includes second zone 200, is configured to selectively provide electric current to selected portion 67, which includes load 154 through the use of isolation device 77.

In FIG. 4, the total fault reparation time is $T_{fr}$, and the capacity of second power source 240 is shown in dashed lines at 290. Therein, capacity 290 includes an initial capacity 292 between times $t_0$ and $t_1$, as well as a subsequent capacity 294 between times $t_1$ and $T_{fr}$. Capacity 290 may change from initial capacity 292 to subsequent capacity 294 due to a variety of factors. As a non-exclusive illustrative example, second power source 240 may include one or more periodic power sources that may only provide electric current to zone 200 during certain time intervals. Non-exclusive illustrative examples of periodic power sources may include solar and/or wind-based power generation systems. As another non-exclusive illustrative example, a portion of second power source 240 may be taken offline, such as for scheduled maintenance, at time $t_1$, thereby decreasing the magnitude of capacity 290 from initial capacity 292 to subsequent capacity 294. As yet another non-exclusive illustrative example, a portion of second power source 240 may be damaged or otherwise unable to provide electric current after time $t_1$.

Between times $t_0$ and time $t_1$, the magnitude of total load 295, which includes the plurality of loads present within zone 200, as well as load 154 of selected portion 67, is less than the magnitude of initial capacity 292. Under these conditions, electric distribution system 10 may close isolation device 77 and provide electric current from restoration area 80 to selected portion 67 without the use of one or more DR loads 52 to increase the excess capacity of restoration area 80 and/or decrease the magnitude of the load that is applied to the restoration area by selected portion 67.

In contrast, and as shown in dashed lines in FIG. 4, between times $t_1$ and $t_2$, the magnitude of total load 295 may be greater than capacity 290 due to the decrease in capacity 290 from initial capacity 292 to subsequent capacity 294. Thus, and as discussed in more detail herein, electric distribution system 10 may not provide electric current from restoration area 80 to selected portion 67 without first decreasing the magnitude of the load applied by selected portion 67 and/or increasing the excess capacity of restoration area 80 through the use of one or more DR loads.

When a magnitude of a single DR load is sufficient to decrease the magnitude of total load 295 such that total load 295 is less than and/or within a threshold amount 297 of capacity 290, electric distribution system 10 may decrease and/or isolate the single DR load and provide electric current from restoration area 80 to selected portion 67. However, when a magnitude of a single DR load is insufficient to decrease the magnitude of total load 295 such that total load 295 is less than and/or within threshold amount 297 of capacity 290, electric distribution system 10 may utilize multiple DR loads to decrease the magnitude of total load 295.

This is shown schematically in FIG. 4. Therein, the total load between times $t_1$ and $t_2$ without any load shed is shown in dashed lines, the desired total load magnitude 299 between times $t_1$ and $t_2$ to maintain the total load below the capacity of restoration area 80 by at least threshold amount 297 is shown in dotted lines, and the total load between times $t_1$ and $t_2$ when only a first DR load is shed is shown in dash-dot lines. Thus, in the non-exclusive illustrative example of FIG. 4, electric distribution system 10 may shed a plurality of DR loads to decrease total load 295 to desired total load magnitude 299.

Figure 5:
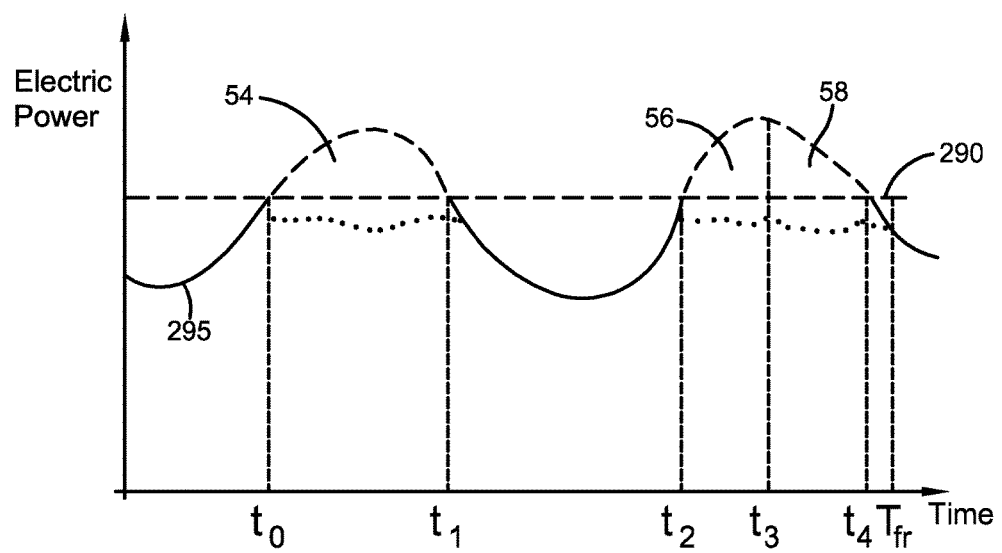
FIG. 5 is another schematic graph providing a non-exclusive illustrative example of an electric power vs. time plot.

FIG. 5 provides yet another non-exclusive illustrative example of an electric power vs. time plot for the electric distribution system of FIG. 2 that includes fault 160. As discussed in more detail herein with reference to FIG. 3, fault 160 may be isolated from the remainder of first zone 100 by opening normally closed isolation devices 174 and 178, and restoration area 80, which includes second zone 200, may be configured to selectively provide electric current to selected portion 67, which may include load 154.

In FIG. 5, capacity 290 is at least substantially constant during fault reparation time $T_{fr}$ and, as shown in dashed lines in FIG. 5, total load 295 periodically increases to a value that is greater than capacity 290. As shown in dotted lines in FIG. 5, between times $t_0$ and $t_1$, a first DR load, such as DR load 250 of FIG. 2, may be shed and/or decreased in order to maintain total load 295 below capacity 290. After the total load decreases to a value that is less than capacity 290, as shown at $t_1$, the first DR load may be placed back in electrical communication with electric distribution system 10 and/or increased.

Similarly, and as shown in dashed lines between times $t_2$ and $t_4$, total load 295 may increase above capacity 290 a plurality of times during fault reparation time $T_{fr}$. Between times $t_2$ and $t_3$, a second DR load may be shed and/or decreased in order to maintain total load 295 below capacity 290. However, the elapsed time between time $t_2$ and time $t_3$ may represent a maximum load shed time for the second DR load, and the second DR load may be placed back in electrical communication with electric distribution system 10 and/or increased after time $t_3$. Thus, between times $t_3$ and $t_4$, a third DR load may be shed and/or decreased in order to continue to maintain total load 295 below capacity 290, as shown in dotted lines between times $t_2$ and $t_4$ in FIG. 5.

Figure 6:
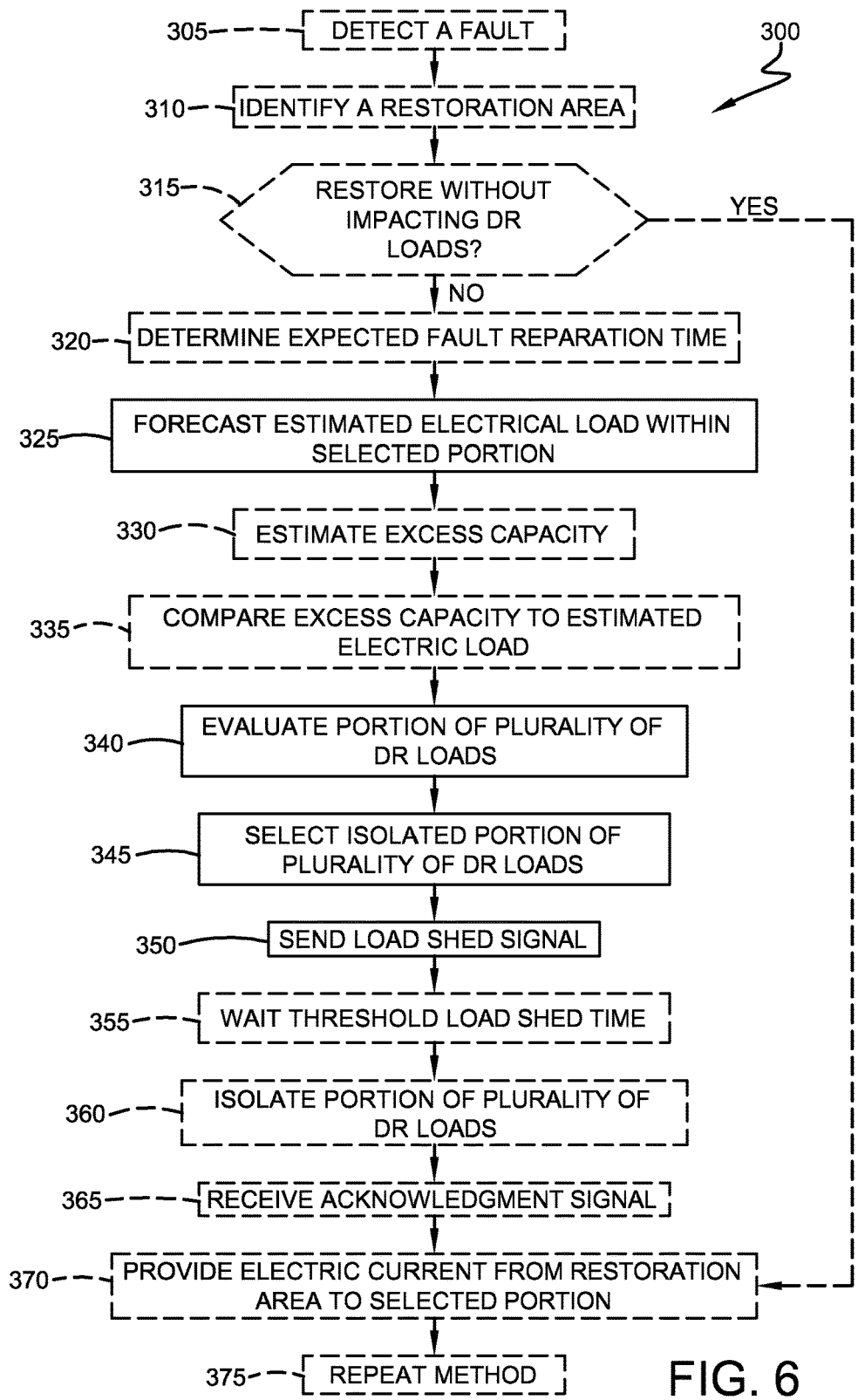
FIG. 6 is a flowchart depicting methods of restoring electrical service to a selected portion of an electric distribution system.

FIG. 6 is a flowchart depicting non-exclusive illustrative examples of methods 300 of restoring electrical service to a selected portion of an electric distribution system. Methods 300 optionally may include detecting a fault at 305, identifying a restoration area at 310, and determining whether or not electrical service may be restored to the selected portion of the electric distribution system without impacting DR loads at 315. If electrical service may be restored to the selected portion without impacting DR loads, the methods may follow the "YES" leg, or decision path, to 370 where electric current may be provided from the restoration area to the selected portion. If electrical service may not be restored to the selected portion without impacting DR loads, the methods may follow the "NO" leg, or decision path, to optional step 320, where the method may determine an expected fault reparation time.

The methods may also include forecasting an estimated electric load within the selected portion at 325 and optionally may include estimating an excess capacity of the restoration area at 330, and/or comparing the excess capacity to the estimated electric load at 335. The methods may further include evaluating a portion of the plurality of DR loads present within the electric distribution system at 340, selecting an isolated portion of the plurality of DR loads at 345, and sending a load shed signal to the isolated portion of the plurality of DR loads at 350. The methods further may optionally include waiting a threshold load shed time at 355, isolating the portion of the plurality of DR loads at 360, and/or receiving an acknowledgment signal at 365. The methods further may optionally include providing electric current from the restoration area to the selected portion at 370 and/or repeating the method at 375.

Detecting the fault at 305 may include the use of any suitable system and/or method to detect an electric fault within the electric distribution system. Non-exclusive illustrative examples of faults include open circuits, short circuits, electric current magnitudes that are above a threshold electric current magnitude, and/or electric current transients that are above a threshold current transient magnitude.

Detecting the fault at 305 also may include determining a location of the fault. It is within the scope of the present disclosure that, once the location of the fault has been determined, methods 300 may, additionally or alternatively, include isolating the fault. As discussed in more detail herein, isolating the fault may include ceasing electrical communication between the fault and a portion of the electric distribution system that is upstream from the fault and/or ceasing electrical communication between the fault and a portion of the electric distribution system that is downstream from the fault. The ceasing electrical communication may include the use of any suitable isolation device, including the non-exclusive illustrative examples of isolation devices that are discussed herein.

Identifying the restoration area at 310 may include the use of any suitable system and/or method to determine a portion of the electric distribution system that is receiving electric current from the electric distribution system and that is selectively configured to provide electric current to the selected portion of the electric distribution system, such as through the use of any suitable electric conduit and/or isolation device. Additionally or alternatively, identifying the restoration area at 310 may include determining a portion of the electric distribution system that includes sufficient excess capacity to supply electric current to the selected portion of the electric distribution system and/or determining a portion of the electric distribution system that is proximal to the outage area and/or the selected portion of the electric distribution system. Non-exclusive illustrative examples of restoration areas include any suitable region, area, and/or zone of the electric distribution system and/or any suitable power sub-station.

Determining whether or not electrical service may be restored to the selected portion without impacting DR loads at 315 may include estimating an excess capacity of the restoration area, comparing the excess capacity to an estimated electric load from the selected portion of the electric distribution system, and determining whether or not the excess capacity is sufficient to supply the estimated electric load. Responsive to determining that the excess capacity is sufficient to supply the excess electric load, the methods may follow the "YES" leg to step 370 and provide electric current from the restoration area to the selected portion of the electric distribution system. Responsive to determining that the excess capacity is not sufficient to supply the excess electric load, the methods may follow the "NO" leg to step 320.

Determining whether or not the excess capacity is sufficient to supply the estimated electric load may include determining that the excess capacity is equal to or greater than the estimated electric load. Additionally or alternatively, determining whether or not the excess capacity is sufficient to supply the estimated electric load may include determining whether or not the excess capacity is within a threshold magnitude of the estimated electric load.

Determining the expected fault reparation time at 320 may include calculating a time to repair the fault and/or estimating a time to repair the fault. The calculating and/or estimating may include calculating and/or estimating automatically and/or manually.

Forecasting the estimated electric load within the selected portion of the electric distribution system at 325 may include forecasting the estimated electric load using any suitable system and/or method. As non-exclusive illustrative examples, the forecasting may include determining a magnitude of the electric load within the selected portion of the electric distribution system prior to the occurrence of the fault and/or estimating an expected electric load within the selected portion of the electric distribution system during the expected fault reparation time. The estimating may include estimating based at least in part upon historical load trends, a load magnitude database, and/or contractual load limits and may include estimating an expected load vs. time correlation during the expected fault reparation time and/or estimating a maximum expected load during the expected fault reparation time.

Estimating the excess capacity of the restoration area at 330 may include the use of any suitable system and/or method to determine a magnitude of the electric current that is available from the power source associated with the restoration area but is not being utilized and/or is not being utilized by the electric loads that are present within the restoration area. As non-exclusive illustrative examples, estimating the excess capacity may include evaluating a maximum electric load that may be supplied by the restoration area, evaluating a magnitude of the electric load that is being supplied by the restoration area, comparing the maximum electric load that may be supplied by the restoration area to the magnitude of the electric load that is being supplied by the restoration area, evaluating a distance between the restoration area and the selected portion of the electric distribution system, and/or evaluating a maximum capacity of an electric conduit that is selectively configured to provide delivery of electric current between the restoration area and the selected portion of the electric distribution system.

Comparing the excess capacity to the estimated electric load at 335 may include the use of any suitable system and/or method to compare the excess capacity to the estimated electric load and/or or to determine if the excess capacity is sufficient to supply the estimated electric load. As non-exclusive illustrative examples, the comparing may include calculating a difference between the excess capacity and the estimated electric load and/or determining if the excess capacity is greater than the estimated electric load by at least a threshold magnitude.

Evaluating the portion of the plurality of DR loads at 340 may include the use of any suitable system and/or method to evaluate the location, maximum magnitude, and/or magnitude vs. time correlation of the portion of the plurality of DR loads during the fault reparation time. As non-exclusive illustrative examples, the evaluating may include estimating a magnitude of an electric load applied by each of the DR loads that comprise the plurality of DR loads and/or estimating an excess capacity of the restoration area. As additional non-exclusive illustrative examples, the evaluating may include collecting information about the plurality of DR loads, determining a present status of the plurality of DR loads, determining a status of the plurality of DR loads prior to the occurrence of the fault, and/or estimating an expected status of the plurality of DR loads during the expected fault reparation time.

Estimating an expected status of the plurality of DR loads may be based at least in part on any suitable historical trend, load magnitude database, and/or contractual load limits that may be determined as part of the DR program. Additionally or alternatively, estimating an expected status of the plurality of DR loads may include estimating a load vs. time correlation of the plurality of DR loads during the expected fault reparation time and/or estimating a maximum expected load of the plurality of DR loads during the expected fault reparation time. The status of the plurality of DR loads may include any suitable parameter associated with the operation of and/or the potential operation of the plurality of DR loads. Non-exclusive illustrative examples of the status include a location of the DR load within the electric distribution system, a maximum magnitude of the DR load, a present magnitude of the DR load, a magnitude vs. time correlation for the DR load, a notification time interval for the DR load, and/or a maximum load shed time for the DR load.

The plurality of DR loads may include at least one DR load within the outage area, such as at least one DR load within the selected portion of the electric distribution system. Additionally or alternatively, the plurality of DR loads also may include at least one DR load within the restoration area.

Selecting the isolated portion of the plurality of DR loads at 345 may include selecting, based upon any suitable criteria, at least a sub-portion of the evaluated DR loads that may be reduced in magnitude and/or electrically isolated from the electric distribution system. As a non-exclusive illustrative example, the selecting may be based, at least in part, upon the forecasting the estimated electric load, the estimating the excess capacity, and/or the evaluating the portion of the plurality of DR loads. As another non-exclusive illustrative example, the selecting may include selecting the isolated portion of the plurality of DR loads such that, when the isolated portion of the plurality of DR loads is isolated from the electric distribution system, the estimated electric load of the selected portion of the electric distribution system is less than the excess capacity of the restoration area.

As a non-exclusive illustrative example, the isolated portion of the plurality of DR loads may include a restoration area DR load that is within the restoration area. When the isolated portion of the plurality of DR loads includes the restoration area DR load, isolating the restoration area DR load from the electric distribution system may include increasing the excess capacity of the restoration area. As another non-exclusive illustrative example, the isolated portion of the plurality of DR loads may include a selected portion DR load that is within the selected portion of the electric distribution system. When the isolated portion of the plurality of DR loads includes the selected portion DR load, isolating the selected portion DR load from the electric distribution system may include decreasing the estimated electric load that may be applied to the restoration area by the selected portion of the electric distribution system.

It is within the scope of the present disclosure that the selecting may include selecting based upon any suitable criteria, non-exclusive illustrative examples of which include randomly selecting, sequentially selecting, manually selecting, selecting based at least in part on a predetermined hierarchy and/or predetermined criteria, selecting based at least in part on a magnitude, and/or a total magnitude, of the DR loads, and/or selecting based at least in part on a magnitude of each of the DR loads that comprise the plurality of DR loads. Additionally or alternatively, the selecting may include selecting such that, after the isolated portion of the plurality of DR loads has been isolated from the electric distribution system, the excess capacity of the restoration area will be greater than the estimated electric load and/or the excess capacity of the restoration area will be greater than the estimated electric load by at least a threshold amount.

Sending the load shed signal at 350 may include the use of any suitable system and/or method to send a load shed signal to the isolated portion of the plurality of DR loads. As a non-exclusive illustrative example, a controller may send the load shed signal. As another non-exclusive illustrative example, sending the load shed signal may include the use of a dedicated electrical conduit or communications pathway to send the load shed signal. As yet another non-exclusive illustrative example, sending the load shed signal may include the use of one or more electric conduits that are also utilized to transmit electric current to power one or more loads within the electric distribution system. In some examples, sending the load shed signal may include isolating at least one DR load of the isolated portion of the plurality of DR loads, such as from the electric distribution system, a selected portion of the electric distribution system, the outage area and/or the restoration area.

As discussed in more detail herein, at least a portion of the plurality of DR loads may include DR loads that are configured for automatic load reduction responsive to receipt of the load shed signal. In addition, and as also discussed in more detail herein, the DR program may include a notification time interval, wherein a customer is to receive pre-notification prior to a DR load associated with the customer being isolated from the electric distribution system. Thus, waiting the threshold load shed time at 355 may include waiting for a threshold time period, which may include, correspond to, and/or be based upon the notification time interval, subsequent to sending the load shed signal but prior to isolating any DR load(s) that are configured for automatic load reduction from the electric distribution system.

Isolating a portion of the plurality of DR loads from the electric distribution system at 360 may include ceasing delivery of electric current between the isolated portion of the plurality of DR loads and the electric distribution system and/or decreasing a magnitude of the electric load that is applied by the isolated portion of the plurality of DR loads. As a non-exclusive illustrative example, and as discussed in more detail herein, the isolating may include opening a normally closed isolation device that is associated with one or more of the isolated portion of the plurality of DR loads.

The isolating may include automatically isolating at least a sub-portion of the isolated portion of the plurality of DR loads from electrical communication with the electric distribution system, such as isolating directly responsive to receipt of the load shed signal by the sub-portion of the isolated portion of the plurality of DR loads. Additionally or alternatively, the isolating may include requesting that at least a requested portion of the isolated portion of the plurality of DR loads be isolated from electrical communication with the electric distribution system, wherein, upon receipt of the request, the customer may manually isolate the requested portion.

Receiving the acknowledgment signal at 365 may include receiving any suitable signal to indicate that at least one of the isolated portion of the plurality of DR loads has been or will be isolated from electrical communication with the electric distribution system. Receipt of the acknowledgment signal may provide for more accurate calculation of the excess capacity of the restoration area and/or the estimated electric load from the selected portion of the electric distribution system by verifying that the DR load associated with the acknowledgment signal has been or will be isolated from the electric distribution system.

Providing electric current from the restoration area to the selected portion of the electric distribution system at 370 may include establishing electrical communication between the selected portion of the electric distribution system and the restoration area. As a non-exclusive illustrative example, and as discussed in more detail herein, this may include closing a normally open isolation device, such as a normally open tie switch, that may be selectively configured to enable, restrict or interrupt the delivery of electric current between the restoration area and the selected portion of the electric distribution system. The closing may be initiated and/or controlled automatically and/or manually.

Repeating the method at 375 may include repeating the method based upon any suitable criteria. As a non-exclusive illustrative example, the repeating may include repeating the forecasting at 325, the estimating at 330, and/or the comparing at 335 to ensure that the excess capacity is greater than the estimated electric load prior to performing the providing at 370. As another non-exclusive illustrative example, the repeating may include repeating the evaluating at 340, the selecting at 345, and/or the sending at 350 responsive to determining that the excess capacity is less than the estimated electric load and/or that the excess capacity is within a threshold magnitude of the estimated electric load. As additional non-exclusive illustrative examples, the repeating may include repeating based at least in part upon expiration of a threshold time interval, expiration of a maximum load shed time for at least one of the isolated portions of the plurality of DR loads, a change in the status of the restoration area, a change in the status of the selected portion of the electric distribution system, a change in the estimated electric load, a change in the expected fault reparation time, and/or a change in the status of at least one DR load associated with the restoration area and/or the selected portion of the electric distribution system.

Figure 7:
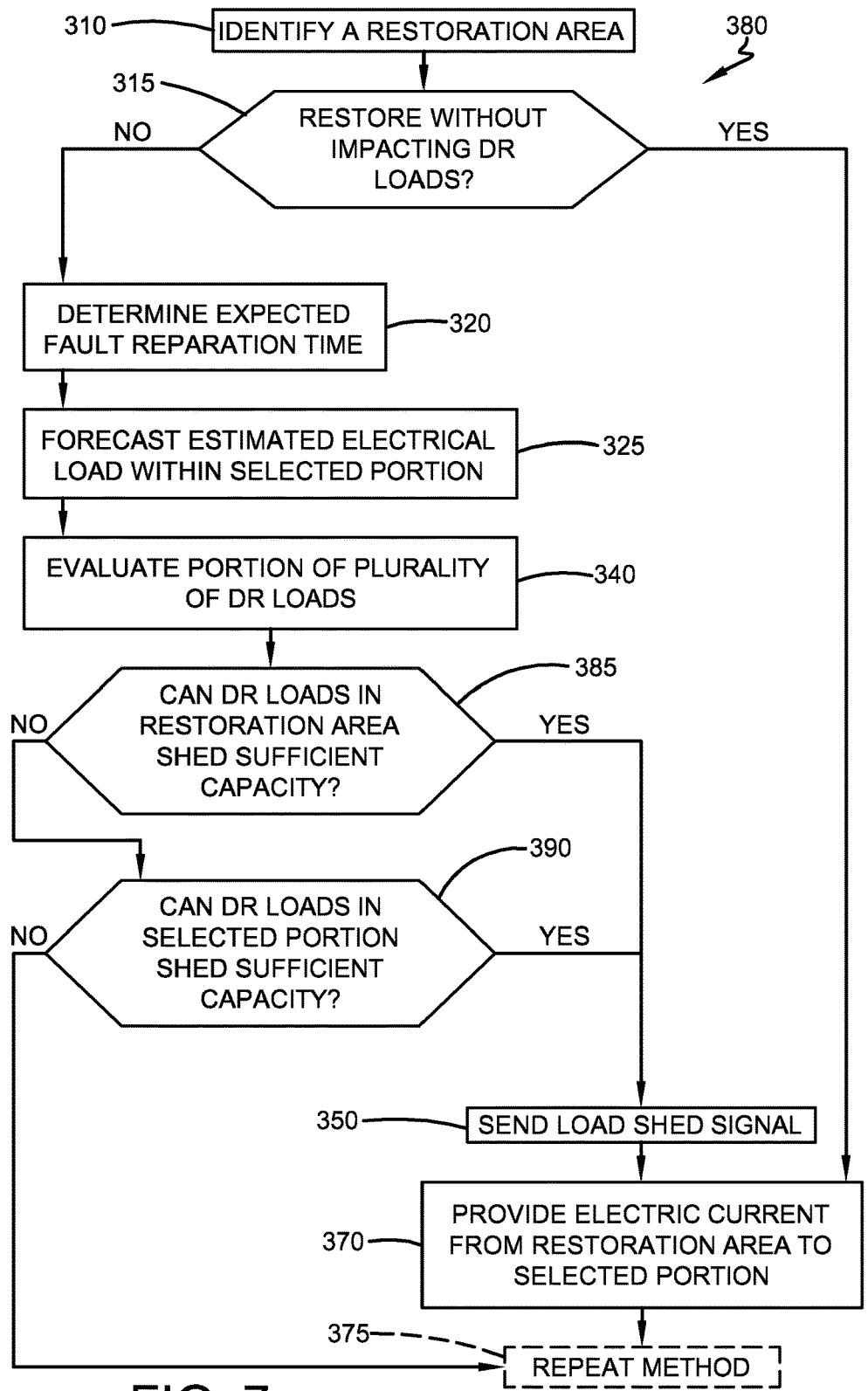
FIG. 7 is another flowchart depicting methods of restoring electrical service to a selected portion of an electric distribution system.

FIG. 7 is a flowchart depicting additional non-exclusive illustrative examples of methods of restoring electrical service to the selected portion of the electric distribution system. The methods of FIG. 7 are generally indicated herein at 380 and include several steps that are similar to, and numbered the same as, the steps performed in methods 300 of FIG. 6. These steps are discussed in more detail above with reference to FIG. 6.

The methods of FIG. 7 include identifying a restoration area at 310 and determining whether or not electrical service may be restored to the selected portion without impacting DR loads at 315. If electrical service may be restored to the selected portion without impacting DR loads, the methods follow the "YES" leg to 370, where electric current is provided from the restoration area to the selected portion. The methods may then proceed to step 375, wherein at least a portion of the methods optionally may be repeated. If electrical service may not be restored to the selected portion without impacting DR loads, the methods follow the "NO" leg to step 320, where the methods determine an expected fault reparation time.

After determining the expected fault reparation time at 320, the methods forecast the estimated electric load within the selected portion of the electric distribution system at 325 and evaluate a portion of the plurality of DR loads at 340 before determining whether or not DR loads within the restoration area may shed sufficient capacity to provide for supplying electric current from the restoration area to the selected portion of the electric distribution system at step 385. If the DR loads within the restoration area may shed sufficient capacity, the "YES" leg is followed to step 350, wherein one or more load shed signals are sent to one or more DR loads, before proceeding to step 370, wherein the methods provide electric current from the restoration area to the selected portion of the electric distribution system. The methods may then proceed to step 375.

If the DR loads within the restoration area may not shed sufficient capacity, the "NO" leg is followed to step 390. At step 390, the methods determine whether or not DR loads within the selected portion may shed sufficient capacity to provide for supplying electric current from the restoration area to the selected portion of the electric distribution system (i.e., by reducing the magnitude of the electrical load that may be applied to the restoration area by the selected portion, thereby reducing the magnitude of the electric power to be provided by the restoration area to satisfy the load that is applied by the selected portion). If the DR loads within the selected portion may shed sufficient capacity, the "YES" leg is followed to step 350 before proceeding to step 370 and optionally to step 375. If the DR loads within the selected portion may not shed sufficient capacity, the "NO" leg is followed to step 375.

Determining whether or not DR loads within the restoration area may shed sufficient capacity to provide for supplying electric current from the restoration area to the selected portion of the electric distribution system at 385 may include using any suitable system and/or method to determine whether or not the magnitude of the excess capacity of the restoration area will be sufficient to supply electric current to the selected portion of the electric distribution system subsequent to removal, isolation, and/or shedding of the DR load (which may increase the excess capacity of the restoration area). This may include determining whether or not the excess capacity is equal to, greater than, and/or at least a threshold amount greater than the estimated electric load.

Similarly, determining whether or not DR loads within the selected portion may shed sufficient capacity to provide for supplying electric current from the restoration area to the selected portion may include using any suitable system and/or method to determine whether or not the magnitude of the excess capacity of the restoration area will be sufficient to supply electric current to the selected portion of the electric distribution system subsequent to removal, isolation, and/or shedding of the DR load (which may decrease the electric load applied to the restoration area by the selected portion). The determining at steps 385 and/or 390 may include comparing the excess capacity to the estimated electric load and/or selecting an isolated portion of the plurality of DR loads to receive the load shed signal and be isolated from the electric distribution system during at least a portion of the expected fault reparation time.

Repeating the methods at 375 may include the use of any suitable system and/or method to determine whether or not to repeat any suitable portion of the methods. As a non-exclusive illustrative example, the repeating may include repeating the determining at 320, the forecasting at 325, and the determining and/or comparing at 385 and/or 390 to ensure that the excess capacity is greater than the estimated electric load prior to performing the providing. As another non-exclusive illustrative example, the repeating may include repeating the evaluating at 340, the determining and/or selecting at 385 and/or 390, and the sending at 350 responsive to determining that the excess capacity is less than the estimated electric load and/or that the excess capacity is within a threshold amount of the estimated electric load.

In the non-exclusive illustrative examples of the systems and methods that are disclosed herein, the DR loads are often discussed in the context of being isolated and/or shed from the electric distribution system. As used herein, isolating and/or shedding may include completely isolating a DR load from the electric distribution system such that there is no electric current flow between the electric distribution system and the DR load. Additionally or alternatively, isolating and/or shedding also may refer to decreasing a magnitude of the DR load. This decrease in magnitude may include any suitable decrease, non-exclusive illustrative examples of which include decreases of at least 10%, at least 25%, at least 50%, at least 75%, at least 90%, at least 95%, at least 99%, or 100%.

In the present disclosure, several of the non-exclusive illustrative examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

The disclosed methods and systems may be embodied as or take the form of the methods and systems previously described, as well as of a transitory or non-transitory computer readable medium having a plurality of machine- or computer-readable instructions stored thereon that, when executed by a computer processor, carry out operations of the disclosed systems and/or perform the disclosed methods as computer-implemented or computer-executed methods. The computer-readable medium may be any medium that can contain, store, communicate, propagate, or transport the instructions for use by or in connection with the instruction executing processor, system, apparatus, or device and may, by way of example but without limitation, be an electronic, magnetic, optical, electromagnetic, infrared, or semiconductor system, apparatus, device, or propagation medium or other suitable medium upon which the program is recorded. More specific examples (a non-exhaustive list) of such a computer-readable medium may include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Computer program code or instructions for carrying out operations of the disclosed methods and systems may be written in any suitable programming language provided it allows achieving the previously described technical results. The instructions may be configured for execution on any system or device having sufficient processing power and access to the required data.

As used herein the terms "adapted" and "configured" should be interpreted to mean that the identified elements, components, or other subject matter are selected, created, implemented, utilized, designed, modified, adjusted and/or intended to perform the indicated action and/or to perform, operate, behave and/or react in the indicated manner.

The systems and methods disclosed herein are applicable to the electric power distribution industry.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, recitation in the disclosure and/or the claims of "a" or "a first" element, or the equivalent thereof, should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

What is claimed is:

1. A method of restoring electrical service to a first portion of an electric distribution system, wherein the first portion includes at least a sub-portion of an outage area, wherein the outage area includes a fault and is not receiving an electric current from the electric distribution system, and further wherein the electric distribution system is in electrical communication with a plurality of demand responsive loads, the method comprising:

identifying a restoration area, wherein the restoration area includes a portion of the electric distribution system that is receiving the electric current from the electric distribution system and is selectively configured to provide the electric current to the first portion of the electric distribution system;

determining an expected fault reparation time;

forecasting an estimated electrical load within the first portion of the electric distribution system during the expected fault reparation time;

forecasting an excess capacity of the restoration area during the expected fault reparation time;

forecasting, the operation of the plurality of demand responsive loads during the expected fault reparation time;

determining that the forecasted estimated electrical load is less than the excess capacity of the restoration area for a first portion of the expected fault reparation time;

determining that the forecasted estimated electrical load is greater than the excess capacity of the restoration area for a second portion of the expected fault reparation time following the first portion of the expected fault reparation time;

selecting one or more of the plurality of demand responsive loads to be reduced during the second portion of the expected fault reparation time but not during the first portion of the expected fault reparation time such that the excess capacity of the restoration area is increased to a value greater than the estimated electrical load during the second portion of the expected fault reparation time or such that the estimated electrical load is decreased to a value less than the excess capacity of the restoration area during the second portion of the expected fault reparation time;

providing the electric current from the restoration area to the first portion of the electric distribution system;

transmitting a load shed signal to the selected one or more of the plurality of demand responsive loads, the load shed signal being configured to reduce power consumption from the selected one or more demand responsive loads during the second portion of the expected fault reparation time;

notifying a customer of a future load isolation event during a notification time interval which follows transmitting the load shed signal;

waiting for the notification time interval after transmitting the load shed signal; and isolating the selected one or more of the plurality of demand responsive loads from the electric distribution system after the notification time interval.

2. The method of claim 1, wherein forecasting the operation of the plurality of demand responsive loads includes estimating a magnitude of an electrical load applied by each of the demand responsive loads that comprise the plurality of demand responsive loads.

3. The method of claim 2, wherein the selected one or more of the plurality of demand responsive loads is located within the restoration area.

4. The method of claim 3, wherein the selected one or more of the plurality of demand responsive loads is located within the first portion of the electric distribution system.

5. The method of claim 1, wherein the method further includes repeating the selecting and transmitting the load shed signal during the expected fault reparation time.

6. The method of claim 1, wherein first portion of the expected fault reparation time precedes the second portion of the expected fault reparation time.

7. The method of claim 1, wherein forecasting the excess capacity includes forecasting power output by a periodic power source.

8. The method of claim 7, wherein periodic power source includes a solar power generation system or a wind-based power generation system.

9. A method of restoring electrical service to a first portion of an electric distribution system, the method comprising:
forecasting an estimated electrical load within the first portion of the electric distribution system during an expected fault reparation time;
forecasting an excess capacity of a restoration area during the expected fault reparation time;
forecasting the operation of a plurality of demand responsive loads configured to reduce power consumption in response to receiving a load shed signal;
determining that the excess capacity exceeds the estimated electrical load during a first portion of the expected fault reparation time;
determining that the estimated electrical load exceeds the excess capacity during a second portion of the expected fault reparation time;
selecting one or more of the plurality of demand responsive loads to receive a load shed signal with respect to the second portion of the expected fault reparation time such that excess capacity exceeds the estimated electrical load and not to receive a load shed signal with respect to the first portion of the expected fault reparation time;
providing an electric current from the restoration area to the first portion of the electric distribution system;
transmitting the load shed signal to the selected one or more of the plurality of demand responsive loads, the load shed signal being configured to reduce power consumption from the selected one or more demand responsive loads during the second portion of the expected fault preparation time;
waiting for a notification time interval after transmitting the load shed signal during which a customer is notified of an upcoming demand responsive load isolation event; and
isolating the selected one or more of the plurality of demand responsive loads from the electric distribution system after waiting for the notification time interval.

10. The method of claim 9, wherein the method further includes identifying the restoration area, wherein the restoration area includes a portion of the electric distribution system that is receiving the electric current from the electric distribution system, and further wherein the restoration area is selectively configured to provide the electric current to the first portion of the electric distribution system.

11. The method of claim 9, wherein the method further includes determining the expected fault reparation time.

12. The method of claim 9, wherein the method further includes repeating the selecting and transmitting a load shed signal during the expected fault reparation time.

13. The method of claim 9, wherein the forecasting includes estimating an expected electrical load within the first portion of the power distribution system during the expected fault reparation time, and further wherein the estimating includes estimating at least one of an expected load vs. time correlation during the expected fault reparation time and a maximum expected load during the expected fault reparation time.

14. The method of claim 9, wherein forecasting the excess capacity of the restoration area includes at least one of evaluating a maximum electrical load that may be supplied by the restoration area, evaluating a magnitude of an electrical load that is being supplied by the restoration area, comparing the maximum electrical load that may be supplied by the restoration area to the magnitude of the electrical load that is being supplied by the restoration area, evaluating a distance between the restoration area and the first portion of the electric distribution system, and evaluating a maximum capacity of an electrical conduit that is selectively configured to provide electrical communication between the restoration area and the first portion of the electric distribution system.

15. The method of claim 9, wherein the selecting includes selecting the one or more of the plurality of demand responsive loads such that, after the one or more demand responsive loads responds to the load shed signal, the excess capacity is increased.

16. The method of claim 9, wherein the selected one or more of the plurality of demand responsive is located within the restoration area.

17. The method of claim 9, wherein the selected one or more of the plurality of demand responsive loads is located in the first portion where selecting one or more of the plurality of demand responsive loads includes determining that reducing the power consumption of one or more of the plurality of demand responsive loads located in the restoration area will not increase the excess capacity of the restoration area to be greater than the forecasted estimated electrical load during the second portion of the expected fault reparation time and selecting one of the plurality of demand responsive loads located in the first portion will reduce the forecasted estimated electrical load to be less than the excess capacity of the restoration area during the second portion of the expected fault reparation time.

18. The method of claim 9, wherein the method comprises selecting more than one of the plurality of demand responsive loads and the selecting includes automatically isolating at least a sub-portion of the isolated portion of the selected plurality of demand responsive loads from the electric distribution system directly responsive to receipt of the load shed signal.

19. The method of claim 9, wherein the method comprises manually isolating the selected one or more of the plurality of demand responsive loads.

20. The method of claim 9, wherein the method further includes receiving an acknowledgement signal indicating that the selected one or more of the plurality of demand responsive loads has been isolated from the electric distribution system.

21. The method of claim 9, wherein providing the electric current includes establishing electrical communication between the first portion of the electric distribution system and the restoration area.

22. The method of claim 9, wherein the first portion of the electric distribution system includes at least a sub-portion of an outage area, wherein the outage area includes a fault, wherein the outage area is not receiving the electric current from the electric distribution system, wherein the method includes detecting and isolating the fault, wherein the isolating includes ceasing electrical communication between the fault and a portion of the electric distribution system that is upstream from the fault, and further wherein the isolating includes ceasing electrical communication between the fault and a portion of the electric distribution system that is downstream from the fault.

23. The method of claim 9, wherein the method further includes repeating the method, wherein the repeating is performed responsive at least in part to at least one of expiration of a threshold time interval, expiration of a maximum load shed time for the selected one or more of the plurality of demand responsive loads, a change in a status of the restoration area, a change in a status of the first portion of the electric distribution system, a change in the estimated electrical load, a change in the expected fault reparation time, and a change in a status of at least one demand responsive load associated with at least one of the restoration area and the first portion of the electric distribution system.

24. The method of claim 9 embodied as a plurality of executable instructions that are stored on a non-transitory storage medium and that, when executed, implement a computer-executable method according to claim 9.

25. The method of claim 9, wherein first portion of the expected fault reparation time precedes the second portion of the expected fault reparation time.

26. A system for restoring electrical service to a first portion of an electric distribution system, the system comprising:

a controller configured to perform the method of claim 9.

* * * * *